Figure 1:
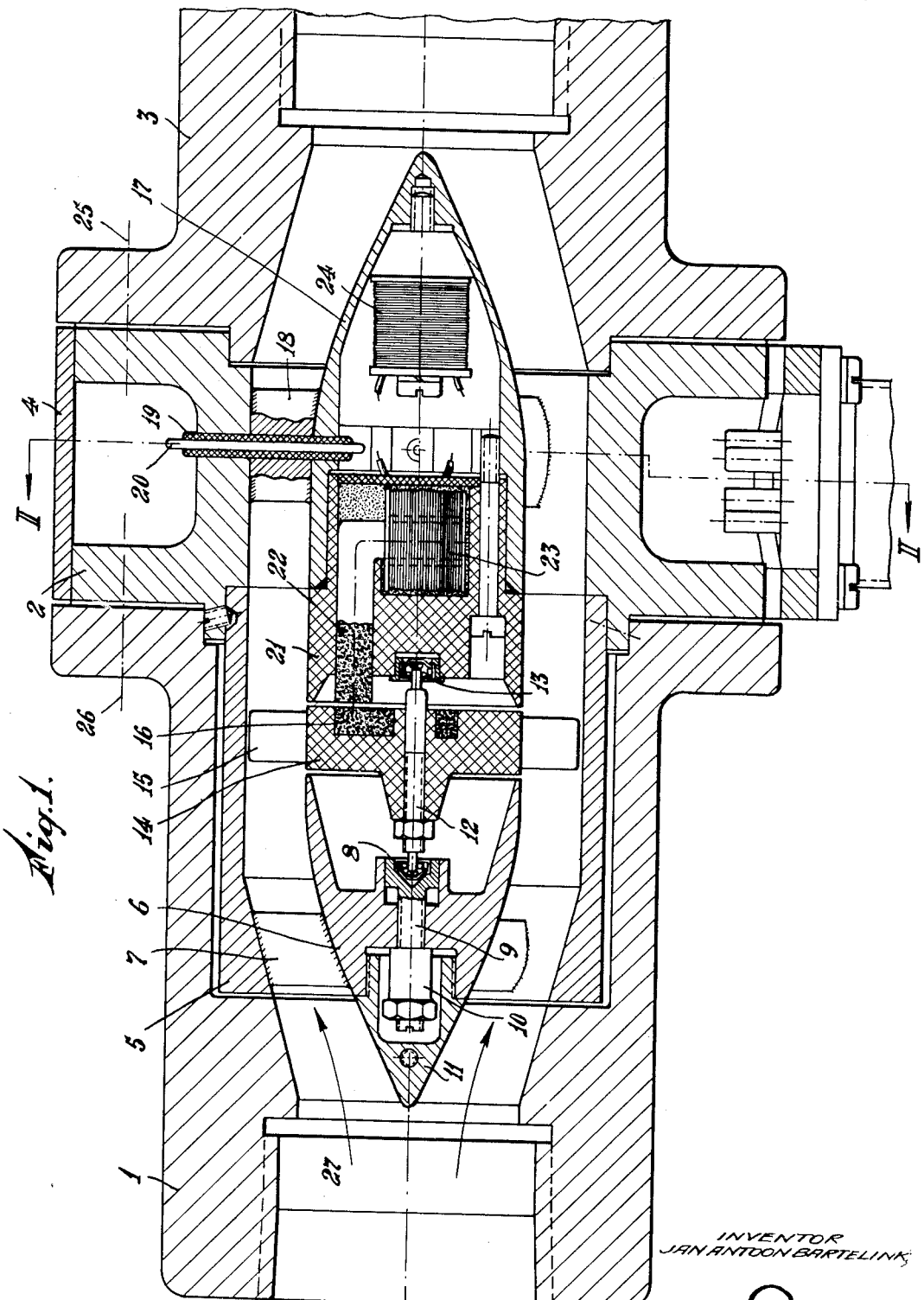

Dec. 27, 1955  J. A. BARTELINK  2,728,893
FLOWMETER
Filed Nov. 3, 1952  2 Sheets-Sheet 1

INVENTOR
JAN ANTOON BARTELINK
BY Robert B. Pearson
ATTORNEY

Dec. 27, 1955   J. A. BARTELINK   2,728,893
FLOWMETER
Filed Nov. 3, 1952   2 Sheets-Sheet 2
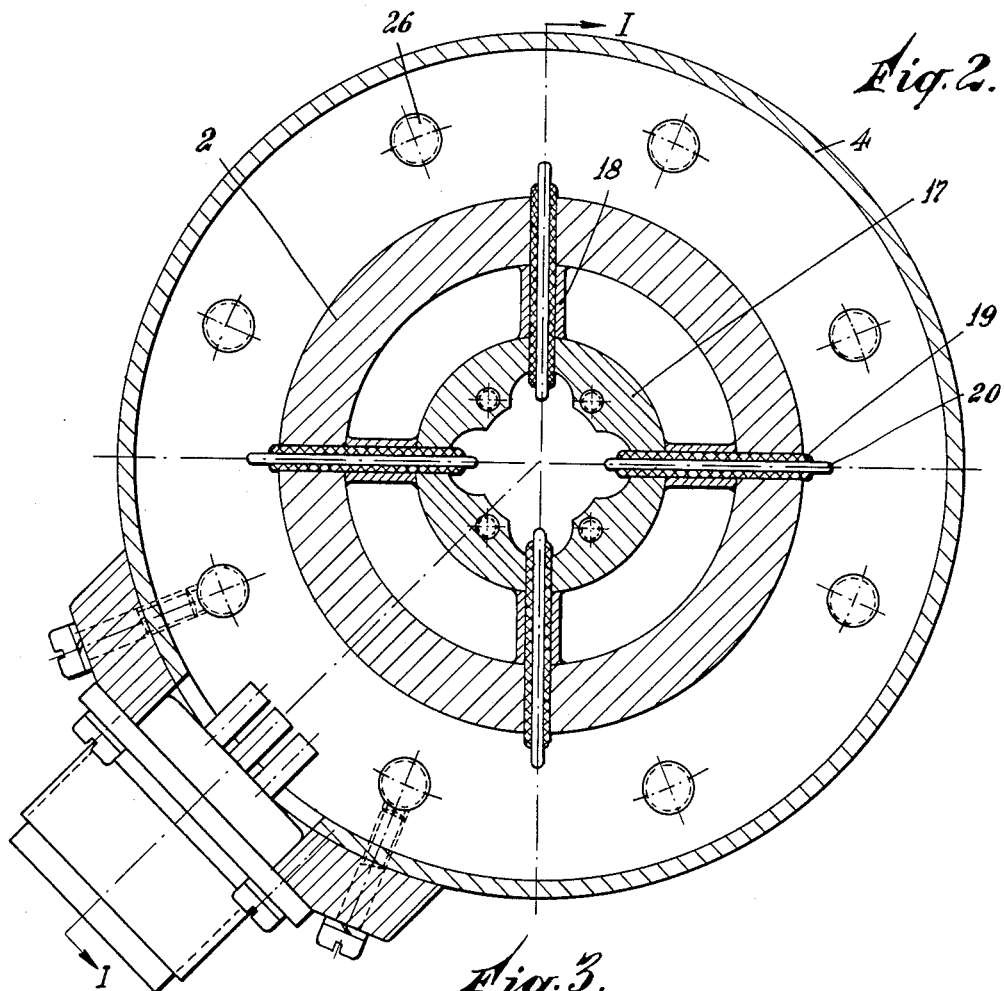
Fig. 2.
Fig. 3.
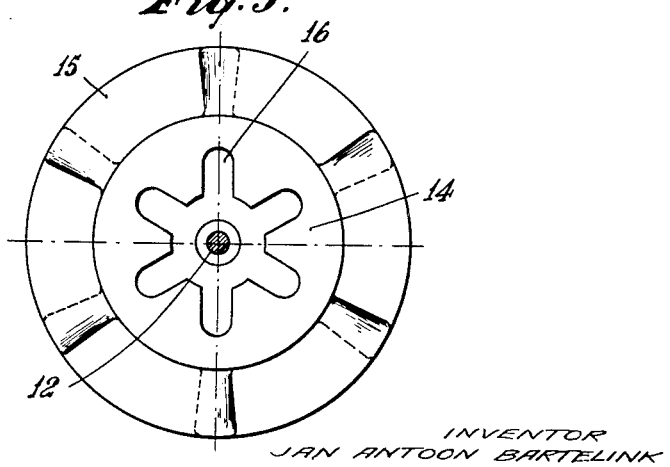
INVENTOR
JAN ANTOON BARTELINK
BY Robert B. Pearson
ATTORNEY

United States Patent Office 2,728,893
Patented Dec. 27, 1955

2,728,893

FLOWMETER

Jan Antoon Bartelink, Amsterdam, Netherlands, assignor to National Luchtvaartlaboratorium, Amsterdam, Netherlands, a corporation of the Netherlands Application November 3, 1952, Serial No. 318,473

Claims priority, application Netherlands August 2, 1952

7 Claims. (Cl. 336—30)

The invention relates to a device for the continuous determination of the quantity of liquid or gas flowing through a pipe per unit of time, and/or the quantity thereof which has flowed through during a given period of time. In particular the device according to the invention is suitable for use as a fuel consumption gauge in airplanes.

It is desirable to construct a flow meter in such a way that the energy consumed by it (which is provided by the medium flowing through the pipe) is as low as possible. In previous efforts to achieve this the flow meter was designed as a kind of turbine driven by the medium, which is coupled to a toothed disk, its teeth periodically intercepting a pencil of light falling upon a photo-electric cell as the turbine rotates. By this means the photo-electric cell will emit periodical current impulses which are conducted to suitable receiving and indicator apparatus. There are, however, several drawbacks connected with a flow meter of this type, viz:

1. The photo-electric cell and the incandescent lamp emitting the pencil of light are fairly vulnerable and have a limited life;
2. The mass of the disk fitted to the rotor is rather great, thus placing an extra load on the rotor bearings;
3. For constructional reasons the disk is located in the stream of liquid, which causes an increase in the liquid friction forces acting upon the rotor system. This in turn has the result of tending to prevent the rotor from starting to move when there is a low velocity of flow, while because of this the influence of the viscosity of the medium flowing through, which depends upon the temperature, is augmented, this of course affecting the accuracy of the reading unless special action is taken to correct this influence;
4. The electronic frequency meter responds only to input voltages higher than a certain threshold value, inasmuch as variations in the extent and the curvature of the photo-electric cell voltage must not be allowed to have any effect on the readings. Now the voltage supplied by a photocell of photovoltaic type is only slightly higher than the threshold value just referred to and thus gives only a very small reserve unless additional aids, such as an amplifier, are employed. Better in this respect is the gas-filled photo-emission cell, but a cell of this type has such a high impedance and demands so much load resistance that the properies of the cable connecting the measuring element of the frequency meter have to be of a very special standard;
5. Both the lamp and the photo-cell must be separated by panels fitted liquid-proof in the rotor casing from the liquid flowing through this casing.

The present invention has for its object to obviate the above drawbacks inherent in the photo-electric system, and consists of a flow meter comprising a mainly cylindrical casing, a vane wheel rotatively located in said casing and provided with an armature of ferromagnetic material, and a stationary coil placed around an open ferromagnetic core, said core being positioned in such relationship with respect to the armature that when the vane wheel is rotated the magnetic resistance of the circuit formed by the ferromagnetic material is periodically varied. High-frequency alternating current (of a frequency lying e. g. between 300 and 500 kc./s) generated outside the device is passed through the coil, the amplitude of this current being modulated by the variations in the resistance of the magnetic circuit. From this current a modulated high-frequency voltage is derived, whose modulation frequency is thus proportional to the speed of the rotor. This is detected and consequently made serviceable for feeding an indicator apparatus of appropriate type.

The invention is limited to the transmitter, i. e. to the device which modulates the high-frequency alternating current. The receiver and the generator of the high-frequency alternating current fall outside the scope of the invention. Moreover, suitable devices are themselves already known for this purpose.

The device according to the invention can be made very strong mechanically, so its life will be practically unlimited, and moreover it requires a minimum amount of maintenance.

In order to keep the dimensions of the coil core and the armature as small as possible, the ferromagnetic material of which they are manufactured should have a high magnetic permeability. The material put on sale under the proprietary name of "Ferroxcube" or a similar material may be used to advantage.

When stationary the rotor tends to assume a position in which the magnetic resistance of the magnetic circuit is at a minimum. In order to get the rotor out of this position a certain—though slight—torque is needed. For the sake of accuracy it is advisable to reduce this torque as much as possible, which can be done by reducing the distance between the axis of rotation and the magnetic circuit at the point of the gap between the armature and the core.

It is also advisable for the rotor to be of very low weight to make it easy to set it in motion and to keep down the load on the bearings. For this purpose it is preferable to make the rotor of light metal or synthetic resin. The mere absence of the disk provided with holes or teeth which is needed for the photo-electric system considerably reduces the weight of the rotor.

The device according to the invention makes it possible without much trouble to obtain an alternating voltage after the detector of about 40 v.eff, and through this therefore at least a ten-fold improvement is obtained as compared with the photo-electric system which at its very best produces 3 to 4 v.eff. Furthermore the cable has to satisfy considerably simpler requirements.

It is of advantage to provide the device with a temperature correcting resistance, placed in such a way that it assumes as well as possible the temperature of the flowing liquid. This enables the quantity by weight flowing through to be determined directly and very accurately. It has proved possible to connect this correcting resistance with the indicator apparatus via the same wiring as carries the high-frequency signal, providing the temperature correcting device is blocked against the high-frequency voltage by filters of simple design. In this way it will therefore be sufficient to have one single cable comprising only two conductors.

The invention will be illustrated by reference to an embodiment shown in the drawing, in which:

Fig. 1 represents a longitudinal section of the flow meter according to the invention, Fig. 2 a cross section along the line II—II of Fig. 1 and Fig. 3 an axial elevation of the rotor.

Fig. 1 is a longitudinal section taken along the line

I—I of Fig. 2. The casing proper is built up of three parts, 1, 2 and 3, joined together by means of bolts 25, 26, shown by their centre lines. Part 2 furthermore bears an extension piece 5, which protrudes into part 1 and to which part 6 is secured by means of streamlined supports 7, this part 6 carrying the front ball bearing 8 of the rotor shaft 12. This bearing can be adjusted axially with the screw 9 which can be screwed into and out of part 6 and which is provided with a locknut 10, enclosed by a cap 11. The middle part 2 of the casing supports by means of similarly streamlined supports 18 a cap 17 containing the rear ball bearing 13 of the rotor shaft 12, a coil 23 wound around an L-shaped ferromagnetic core 22, and a temperature correcting resistance 24. The electrical connections of the coil and of the corrector resistance are formed by means of conductors 20 passing through the supports 18 and electrically separated from them by an insulator 19, these conductors being connected in the space enclosed by a cap 4 to the cable running to the indicator apparatus. The direction of flow of the liquid through the casing is shown by the arrows 27. The front part 21 of the cap 17 is manufactured from a non-ferromagnetic insulating material in which the coil 23 and the ferromagnetic core 22 are fitted. The rotor 14 mounted on the shaft 12 is provided with vanes 15 and also carries a star-shaped armature 16 made of ferromagnetic material. When the rotor revolves the magnetic resistance of the magnetic circuit formed by the armature 16 and the core 22 is varied with a frequency proportional to the speed of rotation of the rotor and therefore to the velocity of flow of the liquid through the casing. The rotor is of course manufactured from non-ferromagnetic material, preferably with a low specific gravity. The temperature correcting winding 24 consists of a metal wire with a high temperature co-efficient of the electrical resistance, so that its electrical resistance is greatly dependent upon the temperature of the liquid flowing through. This temperature correcting resistance is likewise suitably connected to the indicator apparatus, e. g. as shown in my co-pending U. S. A. patent application No. 319,363. In this way it is possible to make the reading of the weight independent of changes in the specific gravity of the flowing liquid due to variations in temperature over a wide range.

It is of course possible to conceive other versions of the flow meter without going beyond the scope of the invention.

I claim:

1. A flow meter, suitable for use as a fuel consumption gauge for aircraft, comprising: a substantially cylindrical casing through which the fluid may flow, a rotor provided with a hub and vanes mounted within said casing coaxial therewith, a member of circular cross-section contiguous with said rotor and positioned coaxially within said casing, said member having an external diameter substantially equal to that of the rotor hub, an open core of ferromagnetic material and a coil positioned around said core, said core and said coil being located within said member, said core having at least one of its open ends facing the rotor hub and located substantially flush with the surface of said member facing said rotor hub, and an armature of ferromagnetic material associated with said rotor to be rotated thereby, said armature being located adjacent said core end, whereby the magnetic resistance of the magnetic circuit formed by said core and said armature can be varied periodically.

2. A flow meter according to claim 1, wherein the rotor is supported by said member at one side thereof and by another member at the other side thereof, both members positioned adjacent the rotor hub, said rotor hub and said members constituting together an assembly of streamlined profile located within said casing coaxially therewith.

3. A flowmeter according to claim 1 in which the core is shaped as an L.

4. A flowmeter according to claim 1 in which the gap between the armature and open end of the core is very small.

5. A flowmeter according to claim 4 in which the distance between the axis of rotation of said rotor and the gap between the armature and core is very small.

6. A flowmeter according to claim 1 in which said armature is star shaped.

7. A flowmeter according to claim 1 in which said rotor is carried by a rotor hub made of non-ferromagnetic material, said armature being embedded in said rotor hub.

References Cited in the file of this patent

UNITED STATES PATENTS

| | | |
|---|---|---|
| 2,127,847 | Schulte | Aug. 23, 1938 |
| 2,299,406 | Potter | Oct. 20, 1942 |
| 2,325,927 | Wilbur | Aug. 3, 1943 |
| 2,493,028 | Putt | Jan. 3, 1950 |
| 2,541,422 | Kirkland | Feb. 13, 1951 |
| 2,623,389 | Van Oosterom | Dec. 30, 1952 |

FOREIGN PATENTS

| | | |
|---|---|---|
| 645,074 | Germany | May 21, 1937 |